United States Patent [19]

Walters

[11] Patent Number: 4,483,930

[45] Date of Patent: Nov. 20, 1984

[54] CERAMIC FIBER COMPOSITION

[75] Inventor: Thomas E. Walters, Johnson City, Tenn.

[73] Assignee: Combustion Engineering, Inc., Windsor, Conn.

[21] Appl. No.: 468,228

[22] Filed: Feb. 22, 1983

[51] Int. Cl.³ ............................................. C03C 13/14
[52] U.S. Cl. ...................................... 501/36; 501/95; 501/144
[58] Field of Search ............................ 501/36, 95, 144

[56] References Cited

U.S. PATENT DOCUMENTS

| | | | |
|---|---|---|---|
| 1,409,953 | 3/1922 | Jeffery | 501/144 |
| 2,485,724 | 12/1945 | Ford | 501/144 |
| 4,240,833 | 12/1980 | Myles | 501/95 |
| 4,257,812 | 3/1981 | Johnson et al. | 501/95 |
| 4,384,046 | 5/1983 | Nakagami | 501/95 |
| 4,405,723 | 9/1983 | Kainzner et al. | 501/36 |

FOREIGN PATENT DOCUMENTS 0263765  6/1927  United Kingdom ............... 501/144

OTHER PUBLICATIONS

Ceramic Industry Magazine, Jan. 1967, pp. 90, 92 and 103.

*Primary Examiner*—R. L. Andrews
*Assistant Examiner*—Terryence Chapman
*Attorney, Agent, or Firm*—Richard H. Berneike

[57] ABSTRACT

A ceramic fiber composition suitable for use in the temperature range of 650° C. to 1100° C. formed from aluminum silicate and feldspar. The aluminum silicate is preferably calcined kaolin and comprises 65 percent to 95 percent by weight of the mixture with the remainder being the feldspar.

4 Claims, No Drawings

CERAMIC FIBER COMPOSITION

BACKGROUND OF THE INVENTION

This invention relates to refractory fiber compositions and more particularly to a material for use at an intermediate temperature range as thermal insulation.

Aluminum silicate fibers containing essentially no ingredients except alumina and silica have been widely used for many years for thermal insulation capable of withstanding temperatures up to approximately 1260° C. Aluminum silicate fibers containing certain additive materials such as chromia and borax have been used for temperatures up to and in excess of 1315° C. Such compositions are difficult to form into fibers since the melting temperature is high and the temperature range in which the melt remains in the proper condition is narrow and solidification is rapid. These fibers are therefore quite expensive and are used only where the high temperature ranges involved are required.

In the temperature range below about 650° C., there are a wide variety of inexpensive fiber materials which can be used as insulation. Examples are glass fibers and mineral wools. These inexpensive materials, however, are very limited as to the maximum temperature which they will withstand. Between the high temperature, expensive fibers previously mentioned, and the inexpensive, low temperature fibers there is a gap. Thus, where temperature requirements call for insulation which is serviceable in the temperature range of 650° C.–1100° C. either the expensive fibers or some kind of refractory block insulation must be used.

The service temperature of fiber insulation is determined by three criteria. The first is the fact that the fiber must not melt or sinter at the service temperature. The second criteria is that the blanket made from the fibers must not have excessive shrinkage at the service temperature. Excessive shrinkage causes openings to form between the blankets through which the heat can flow. The third criteria is the amount of devitrification or crystallization that occurs. The more crystalline the fiber becomes, the more brittle it is, thus decreasing the flexibility and resiliency of the blankets.

It is thus evident that there is a significant need for inexpensive ceramic fiber materials which will have service temperatures in the range of 650° C. to 1100° C. Such fiber would find widespread use in bulk, mat or blanket form as insulation for furnaces, kilns and the like wherein the insulation is subjected to temperatures in this range. They would also be particularly useful as insulations for catalytic mufflers.

SUMMARY OF THE INVENTION

This invention comprises ceramic fiber compositions particularly suitable for use as insulation in the temperature range of from 650° C. to 1100° C. The fibers are formed from aluminum silicate and feldspar. The aluminum silicate particles are preferably of a relatively large particle size.

DESCRIPTION OF THE PREFERRED EMBODIMENTS

Ceramic fibers are usually formed from calcined high aluminum silicate materials such as calcined kaolin. Fibers formed from kaolin alone (which is a relatively expensive material) or with certain additives such as alumina and borax (which are even more expensive) form a high temperature fiber serviceable to about 1315° C. It has been found that feldspar, which is relatively inexpensive, can be added in small quantities to the calcined kaolin. This results in a reduction of the serviceable temperature range to below 1093° C. but also significantly reduces the raw material cost. This is not a mere matter of selecting an inexpensive diluent. The combination of the additive with the calcined kaolin must meet certain criteria as to the amount of melt energy that is required, the linear shrinkage of the product within the operating temperature range and the percentage yield. The percent linear shrinkage of this new composition is within acceptable limits, and the melt energy that is required is relatively low. The following table presents relative data on four examples wherein example 1 is calcined kaolin alone, example 2 is calcined kaolin with silica, example 3 is calcined kaolin with silica and borax and example 4 is calcined kaolin with feldspar. It has also been found that the percentage yield is increased by the addition of the feldspar as compared to the calcined kaolin alone.

TABLE

|  | EXAMPLE 1 | | EXAMPLE 2 | | EXAMPLE 3 | | EXAMPLE 4 | |
| --- | --- | --- | --- | --- | --- | --- | --- | --- |
|  | % | $/lb. | % | $/lb. | % | $/lb. | % | $/lb. |
| Calcined Kaolin (−3 m) | 100.00 | .042 | 87.5 | .037 | 87.5 | .037 | 83.3 | .035 |
| Silica |  |  | 12.5 | .002 | 10.4 | .002 |  |  |
| Borax |  |  |  |  | 2.1 | .008 |  |  |
| Feldspar |  |  |  |  |  |  | 16.7 | .003 |
| Raw Material Cost |  | .042 |  | .039 |  | .047 |  | .038 |
| Melting Energy KWH/lb. |  | .78 |  | .88 |  | .71 |  | .73 |
| % linear shrinkage at 2000° F./24 Hrs. | 1.0 |  | 1.5 |  | 1.5 |  | 2.5 |  |

Feldspar is a somewhat general name which is given to a group of sodium and potassium aluminum-silicates with the formula $(Na,K)AlSi_3O_8$ and with varying amounts of sodium and potassium. A typical composition for a feldspar is as follows in weight percent:

TABLE 2

| $SiO_2$ | 68 |
| --- | --- |
| $Al_2O_3$ | 19 |
| CaO | 1.85 |
| $K_2O$ | 3.75 |
| $Na_2O$ | 7.15 |
| Other | .25 |

A typical composition of the resulting fiber also in weight percent is as follows:

TABLE 3

| $Al_2O_3$ | 41 |
| --- | --- |
| $SiO_2$ | 54 |
| $Na_2O/K_2O$ | 2 |
| Impurities | 3 |

The percentage of linear thermal shrinkage of this new fiber composition is within acceptable limits at temperatures below 1100° C. Because this shrinkage significantly increases at temperatures above 1100° C., this new material would be generally unacceptable for such higher temperatures.

Although example 4 shows a specific percentage of kaolin and feldspar, the percentage of feldspar may range between 5 and 35 percent with the range for the calcined kaolin or other aluminum silicate material being from 65 to 95 percent. The preferred calcined kaolin has about 47 percent by weight $Al_2O_3$ and 49 percent by weight $SiO_2$.

I claim:

1. A refractory fiber composition suitable for uses as thermal insulation in temperature ranges of from 650° C. to 1100° C. formed from a melt consisting essentially of 65 percent to 95 percent by weight aluminum silicate particles and 5 percent to 35 percent feldspar.

2. A refractory fiber composition as recited in claim 1 wherein said aluminum silicate is calcined kaolin.

3. A refractory fiber composition as recited in claim 2 wherein said calcined kaolin comprises about 47 percent by weight $Al_2O_3$ and 49 percent by weight $SiO_2$.

4. A refractory fiber composition as recited in claims 1, 2 or 3 wherein said aluminum silicate particles are minus 3 mesh.

* * * * *